United States Patent
Ng et al.

(10) Patent No.: US 10,483,870 B2
(45) Date of Patent: Nov. 19, 2019

(54) POWER CONVERSION METHOD USING VARIABLE POTENTIAL ENERGY STORAGE DEVICES

(71) Applicant: OFFSHORE RENEWABLE ENERGY CATAPULT, Blyth, Northumberland (GB)

(72) Inventors: Chong Hwa Ng, Newcastle upon Tyne (GB); Paul McKeever, Newcastle upon Tyne (GB); Michael Edward Smailes, Newcastle upon Tyne (GB)

(73) Assignee: Offshore Renewable Energy Catapult, Northumberland (GB)

( * ) Notice: Subject to any disclaimer, the term of this patent is extended or adjusted under 35 U.S.C. 154(b) by 0 days.

(21) Appl. No.: 15/573,250

(22) PCT Filed: May 12, 2016

(86) PCT No.: PCT/GB2016/051370
§ 371 (c)(1),
(2) Date: Nov. 10, 2017

(87) PCT Pub. No.: WO2016/181155
PCT Pub. Date: Nov. 17, 2016

(65) Prior Publication Data
US 2018/0131290 A1    May 10, 2018

(30) Foreign Application Priority Data

May 13, 2015   (GB) .................................. 1508146.6

(51) Int. Cl.
*H02M 7/48* (2007.01)
*H02M 7/483* (2007.01)
(Continued)

(52) U.S. Cl.
CPC ............. *H02M 7/483* (2013.01); *H02M 7/49* (2013.01); *H02M 7/501* (2013.01); *H02M 2007/4835* (2013.01); *Y02E 10/76* (2013.01)

(58) Field of Classification Search
CPC ...................... H02M 2007/4835; H02M 7/797
See application file for complete search history.

(56) References Cited

U.S. PATENT DOCUMENTS

| | | | |
|---|---|---|---|
| 2012/0068756 A1 | 3/2012 | Aiello et al. | |
| 2014/0146586 A1* | 5/2014 | Das | H02M 1/36 363/49 |

(Continued)

FOREIGN PATENT DOCUMENTS

| | | |
|---|---|---|
| EP | 2478608 | 7/2012 |
| WO | WO 99/41828 A1 | 8/1999 |
| WO | WO 2013/075928 A1 | 5/2013 |

OTHER PUBLICATIONS

Lu et al., "Asymmetrical Cascade Multilevel Converters with Noninteger or Dynamically Changing DC Voltage Ratios: Concepts and Modulation Techniques," IEEE Transactions on Industrial Electronics, IEEE Service Center, vol. 57, No. 7, pp. 2411-2418; Jul. 2010.

(Continued)

*Primary Examiner* — Fred E Finch, III
*Assistant Examiner* — Rafael O. De León Domenech
(74) *Attorney, Agent, or Firm* — Knobbe Martens Olson and Bear, LLP

(57) ABSTRACT

A power conversion method comprising: charging a plurality of energy storage devices of a power converter from an input power source; and sequentially coupling and decoupling energy storage devices of the plurality of energy storage devices to an output. Charging the plurality of energy storage devices comprises maintaining at least two of (Continued)

the plurality of energy storage devices at substantially different potentials.

18 Claims, 14 Drawing Sheets

(51) Int. Cl.
*H02M 7/49* (2007.01)
*H02M 7/501* (2007.01)

(56) References Cited

U.S. PATENT DOCUMENTS

| | | |
|---|---|---|
| 2015/0036398 A1 | 2/2015 | Garcés et al. |
| 2015/0171726 A1* | 6/2015 | Singh Riar ........... H02M 7/487 363/65 |
| 2016/0072397 A1* | 3/2016 | Deboy .............. H02M 3/33592 363/21.1 |

OTHER PUBLICATIONS

International Search Report and Written Opinion for International Application No. PCT/GB2016/051370 dated Aug. 3, 2016.
International Preliminary Report on Patentability issued in International Application No. PCT/GB2016/051370 dated Nov. 23, 2017.

\* cited by examiner

Possible Voltage Combinations

| | | V1 | V2 | V1+V2 | v3 | V3+V1 | V2+V3 | V1+V2+v3 | v4 | V4+V1 | V4+V2 | V4+V1+V2 | V4+V3 | V4+V3+V1 | V4+V2+V3 | V4+V1+V2+V3 |
|---|---|---|---|---|---|---|---|---|---|---|---|---|---|---|---|---|
| A | -50 | -25 | -25 | 0 | -25 | 0 | 0 | 25 | -25 | 0 | 0 | 25 | 0 | 25 | 25 | 50 |
| B | -50 | -30 | -30 | -10 | -30 | -10 | -10 | 10 | 10 | 10 | 10 | 30 | 10 | 30 | 30 | 50 |
| C | -50 | -30 | -30 | -10 | -20 | -10 | 0 | 20 | -20 | 0 | 0 | 20 | 10 | 30 | 30 | 50 |

A:  V1 = 25; V2 = 25; V3 = 25; V4 = 25
B:  V1 = 20; V2 = 20; V3 = 20; V4 = 40
C:  V1 = 20; V2 = 20; V3 = 30; V4 = 30

| V1 | V2 | V3 | V4 | V1 V2 | V1 -V2 | V1 V3 | V1 -V3 | V1 V4 | V1 -V4 | V2 V3 | V2 -V3 | V2 V4 | V2 -V4 | V3 V4 | V3 -V4 | V1 V2 V3 | V1 V2 -V3 | V1 -V2 V3 | V1 -V2 -V3 | V1 V2 V4 | V1 V2 -V4 | V1 -V2 V4 | V1 -V2 -V4 | V1 V3 V4 | V1 V3 -V4 | V1 -V3 V4 | V1 -V3 -V4 | V2 V3 V4 | V2 V3 -V4 | V2 -V3 V4 | V2 -V3 -V4 | V1 V2 V3 V4 | V1 V2 V3 -V4 | V1 V2 -V3 V4 | V1 V2 -V3 -V4 | V1 -V2 V3 V4 | V1 -V2 V3 -V4 | V1 -V2 -V3 V4 | V1 -V2 -V3 -V4 |
|---|---|---|---|---|---|---|---|---|---|---|---|---|---|---|---|---|---|---|---|---|---|---|---|---|---|---|---|---|---|---|---|---|---|---|---|---|---|---|---|
| 4 | 3 | 2 | 1 | 7 | 1 | 6 | 2 | 5 | 3 | 5 | 1 | 4 | 2 | 3 | 1 | 9 | 1 | 3 | 5 | 7 | 3 | 5 | 1 | 6 | 0 | 2 | 4 | 0 | 8 | 0 | 2 | 6 | 0 | 10 | 2 | 4 | 6 | 8 | 0 | 4 | 0 | 2 |

| Module | Switch | ECD Voltage V | Logic | | | | | | | | | | | | |
|---|---|---|---|---|---|---|---|---|---|---|---|---|---|---|---|
| | | | t0 | t1 | t2 | t3 | t4 | t5 | t6 | t7 | t8 | t9 | t10 | t11 | t12 |
| A | S1 | 1 | 1 | 1 | 1 | 1 | 0 | 1 | 0 | 0 | 0 | 0 | 1 | 0 | 1 |
| B | S1 | 1 | 0 | 1 | 0 | 1 | 1 | 1 | 1 | 0 | 1 | 0 | 0 | 0 | 0 |
| C | S1 | 2 | 1 | 1 | 1 | 1 | 1 | 0 | 0 | 0 | 0 | 0 | 0 | 1 | 1 |
| D | S1 | 2 | 0 | 0 | 1 | 1 | 1 | 1 | 1 | 1 | 0 | 0 | 0 | 0 | 0 |
| E | S1 | 1 | 0 | 0 | 0 | 0 | 1 | 0 | 1 | 1 | 1 | 1 | 0 | 1 | 0 |
| F | S1 | 1 | 1 | 0 | 1 | 0 | 0 | 0 | 0 | 1 | 0 | 1 | 1 | 1 | 1 |
| G | S1 | 2 | 0 | 0 | 0 | 0 | 0 | 1 | 1 | 1 | 1 | 1 | 0 | 0 | 0 |
| H | S1 | 2 | 1 | 1 | 0 | 0 | 0 | 0 | 0 | 0 | 1 | 1 | 1 | 1 | 1 |
| A | S2 | 1 | 0 | 0 | 0 | 0 | 1 | 0 | 1 | 1 | 1 | 1 | 0 | 1 | 0 |
| B | S2 | 1 | 1 | 0 | 1 | 0 | 0 | 0 | 0 | 1 | 0 | 1 | 1 | 1 | 1 |
| C | S2 | 2 | 0 | 0 | 0 | 0 | 0 | 1 | 1 | 1 | 1 | 1 | 0 | 0 | 0 |
| D | S2 | 2 | 1 | 1 | 0 | 0 | 0 | 0 | 0 | 0 | 1 | 1 | 1 | 1 | 1 |
| E | S2 | 1 | 1 | 1 | 1 | 1 | 0 | 1 | 0 | 0 | 0 | 0 | 1 | 0 | 1 |
| F | S2 | 1 | 0 | 1 | 0 | 1 | 1 | 1 | 1 | 0 | 1 | 0 | 0 | 0 | 0 |
| G | S2 | 2 | 1 | 1 | 1 | 1 | 1 | 0 | 0 | 0 | 0 | 0 | 0 | 1 | 1 |
| H | S2 | 2 | 0 | 0 | 1 | 1 | 1 | 1 | 1 | 1 | 0 | 0 | 0 | 0 | 0 |

POWER CONVERSION METHOD USING VARIABLE POTENTIAL ENERGY STORAGE DEVICES

TECHNICAL FIELD

The present invention relates to techniques and apparatus for power converters, and in certain non-limiting examples relates to apparatus and techniques for converting a high voltage direct current input to an alternating current output voltage and vice versa, suitable for power transmission.

BACKGROUND

Traditionally, electrical distribution networks use high voltage alternating current infrastructure for the transmission of power. However, as distance increases the inductive and capacitive parasitic losses associated with alternating current become increasingly problematic. In certain applications, for example where power is generated by offshore wind turbines and the power generated must be transmitted onshore by long lengths of subsea cabling, it is more economical to use high voltage direct current power transmission techniques. Typically, this requires the use of power converters to convert the high voltage direct current to alternating current (and vice versa) so that the generated power can be input to the electrical distribution network.

When converting direct current to alternating current it is desirable to maximise power conversion efficiency (i.e. minimise loss of energy occurring during the conversion process) and to minimise harmonic distortion of the output alternating current waveform.

Recently, multilevel power converters have been developed which have high levels of power conversion efficiency and reduced levels of harmonic distortion.

Modular multilevel converters ("MMCs") are examples of recently developed multilevel power converters. MMCs include a number of energy storage device ("ESD") arranged in series and controlled to create predetermined voltage levels. Each ESD is connected within the converter using a number of switching valves such that the ESD can either be isolated from, or connected to, the output current path of the converter. By sequentially connecting and isolating different combinations of ESDs, different discrete output voltage levels can be generated. A "stepped" waveform can thus be generated which approximates an alternating current voltage waveform. The greater the number of voltage levels (i.e. the greater the number of steps), the closer the output voltage waveform approximates a sinusoid. The closer the output voltage waveform can approximate a sinusoid, the lower the harmonic distortion. Minimising the harmonic distortion of the alternating current/voltage waveform is important because unwanted higher frequency transients present in the output alternating current/voltage waveform can cause damage to components within the distribution network. Using conventional techniques, the only way to increase the number of voltage levels is to increase the number of modules within the converter. However, whilst reducing harmonic distortion, adding further modules increases the cost of the converter. The additional switching components associated with additional ESDs also introduce additional losses which reduce the overall efficiency of the converter.

It is an aim of certain embodiments of the present invention to mitigate the above-mentioned problems.

SUMMARY OF THE INVENTION

In accordance with a first aspect of the invention there is provided a power conversion method, comprising: charging a plurality of energy storage devices of a power converter from an input power source; and sequentially coupling and decoupling energy storage devices of the plurality of energy storage devices to an output. Charging the plurality of energy storage devices comprises maintaining at least two of the plurality of energy storage devices at substantially different potentials.

Aptly, the input power source is a high voltage DC power source, and sequentially coupling and decoupling the energy storage devices of the plurality of energy storage devices to the output generates output voltage levels corresponding to an AC voltage waveform.

Aptly, the input power source is a high voltage AC power source, and sequentially coupling and decoupling the energy storage devices of the plurality of energy storage devices to the output generates an output DC voltage waveform.

Aptly, the power converter is a modular multilevel converter.

Aptly, the steps of sequentially coupling and decoupling the energy storage devices of the plurality of energy storage devices and charging the plurality of energy storage devices are in accordance with a control algorithm.

Aptly, one or more of the energy storage devices are sequentially coupled to the output such that the energy storage devices can be coupled in a forward polarity and a reverse polarity.

Aptly, coupling and decoupling the energy storage devices comprises controlling a switching state of a plurality of switching valves of the modular multilevel converter to thereby isolate or connect each energy storage device with the output of the modular multilevel converter.

Aptly, one or more of the plurality of switching valves comprises a number of switches arranged in series and/or parallel to thereby distribute current and voltage stress associated with changing a switching state of the switching valves.

Aptly, the control algorithm is arranged to change over time the potential to which individual energy storage devices are charged to.

Aptly, the step of charging the plurality of energy storage devices is performed using pulse width modulation.

Aptly, the plurality of energy storage devices comprise one or more capacitors.

Aptly, the method further comprises grouping the plurality of energy storage devices into sets, and allowing the charging of the energy storage devices within each set to a substantially equal potential.

Aptly, the method further comprises selecting one or more sets from the plurality of sets, and selecting energy storage devices from the selected one or more sets to generate the output voltage levels.

In accordance with a second aspect of the invention there is provided a power converter comprising: a plurality of energy storage devices and a control unit, said control unit arranged to control charging of the energy storage devices by an input power source, and said control unit is further arranged to control a sequential coupling and decoupling of the energy storage devices to an output of the converter. The control unit is arranged to control charging of the energy storage devices such that at least two of the plurality of energy storage devices are maintained at substantially different potentials.

Aptly, the input power source is a high voltage DC power source, and the control unit controls the sequential coupling and decoupling of the energy storage devices to the output to generate output voltage levels corresponding to an AC voltage waveform.

Aptly, the input power source is a high voltage AC power source, and the control unit controls the sequential coupling and decoupling of the energy storage devices to the output to generate output voltage levels corresponding to a DC voltage waveform.

Aptly, the power converter is a modular multilevel converter.

Aptly, the control unit controls the charging of the energy storage devices and controls the sequential coupling and decoupling of the energy storage devices to the output in accordance with a control algorithm.

Aptly, one or more of the energy storage devices are arranged to be coupled to the output in a forward polarity and a reverse polarity to generate the output voltage levels.

Aptly, the energy storage devices are sequentially coupled and decoupled from the output by a plurality of switching valves, a switching state of the plurality of switching valves of the modular multilevel converter either isolating or connecting each energy storage device with the output of the modular multilevel converter.

Aptly, one or more of the plurality of switching valves comprises a number of switches arranged in series and/or parallel to thereby distribute a current and voltage stress associated with changing the switching state of the switching valves.

Aptly, the control algorithm is arranged to change over time the potential to which individual energy storage devices are charged to.

Aptly, the control unit controls the charging of the energy storage devices using pulse width modulation.

Aptly, the plurality of energy storage devices comprise one or more capacitors.

Aptly, the plurality of energy storage devices are grouped into sets and the control unit is arranged to control charging of energy storage devices within each set to a substantially equal potential.

Aptly, the control unit is arranged to select one or more sets from the plurality of sets and then to select specific energy storage devices from the selected one or more sets to generate the output voltage levels.

Aptly, the control unit comprises a high level power control function, a final stage module selector and a set control for selecting the sets, wherein the set control is positioned at a stage in the control unit between the high level power control function and the final stage module selector.

Aptly, the control unit comprises a PWM control function and a final stage module selector and a set control for selecting the specific sets, wherein the set control is positioned at a stage in the control unit between the PWM control function and the final stage module selector.

Aptly, the final stage module selector selects an energy storage device from the selected sets.

In accordance with a third aspect of the invention there is provided a computer program for controlling a power converter, said computer program when run on a processor being arranged to cause the processor to control the power converter to perform the power conversion method according to the first aspect of the invention.

In accordance with certain embodiments of the present invention, a technique is provided whereby the level of harmonic distortion arising in the output of a power converter is reduced.

In accordance with certain embodiments of the present invention, a technique is provided whereby the level of harmonic distortion present in an AC or DC voltage output waveform of a power converter, such as a modular multi-level power converter, is reduced by maintaining different energy storage devices (e.g. capacitors) in the power converter at different nominal voltages to thereby increase the number of discrete voltage levels used to generate the output waveform.

In conventional multi-level power converters, the potential of each ESD is controlled to maintain, as closely as possible, an average voltage level which is the same for each ESD.

In contrast, in accordance with embodiments of the invention, one or more ESDs of a converter are specifically controlled to maintain voltage levels that are different from the other ESDs. As a result, a total number of voltage levels that can be achieved by sequentially coupling and decoupling different combinations of ESDs to the output of the convector is increased. This means that the output waveform generated by the converter can have more levels (and thus smaller steps between levels) and therefore will more closely correspond to a sinusoid. Consequently, the harmonic distortion is reduced but without a need to add additional modules. The present technique allows the output harmonic distortion performance of a converter to be improved without incurring the additional switching losses and additional cost associated with conventional techniques for reducing harmonic distortion, such as adding additional modules.

Advantageously, the same principle can be applied for generation of an output DC waveform from an AC input.

Advantageously, a power conversion method in accordance with certain embodiments of the invention can be deployed using substantially a conventional MMC arrangement but with a suitably adapted control algorithm. Accordingly, in certain embodiments, the advantageous effects of the invention can be realised by simply changing/updating the software controlling a conventional MMC provided the increased voltage stress is acceptable.

In accordance with certain embodiments, an MMC can be arranged so that the ESDs can be connected to the output of the MMC in both a forward and reverse polarity. This can be achieved, for example, by use of "full-bridge" module topologies. In such embodiments, the number of output voltage levels can be increased further still.

In accordance with certain embodiments of the invention, switching valves can be used which comprise a number of sub-switches arranged in a series or parallel configuration. Such an arrangement can reduce current and voltage stresses on components within components with the MMC modules thereby reducing a likelihood of component failure and increasing the life of components.

In accordance with certain embodiments of the invention, the ESDs can be charged using a pulse width modulation based technique. Pulse width modulation techniques can allow a finer degree of control to be exerted over the charging of ESDs. Accordingly, in such embodiments, the accuracy with which specific ESDs can be charged to a particular voltage can be improved.

Various further aspects and features of the invention are defined in the claims.

BRIEF DESCRIPTION OF FIGURES

Certain embodiments of the present invention will now be described hereinafter, by way of example only, with reference to the accompanying drawings in which:

FIG. 1b provides a graph of an output alternating current voltage waveform which can be generated using the branch of the converter shown in FIG. 1a;

FIG. 4c provides a table illustrating possible voltage combinations using a full-bridge module topology in accordance with certain embodiments of the invention.

DETAILED DESCRIPTION

Figure 1A:
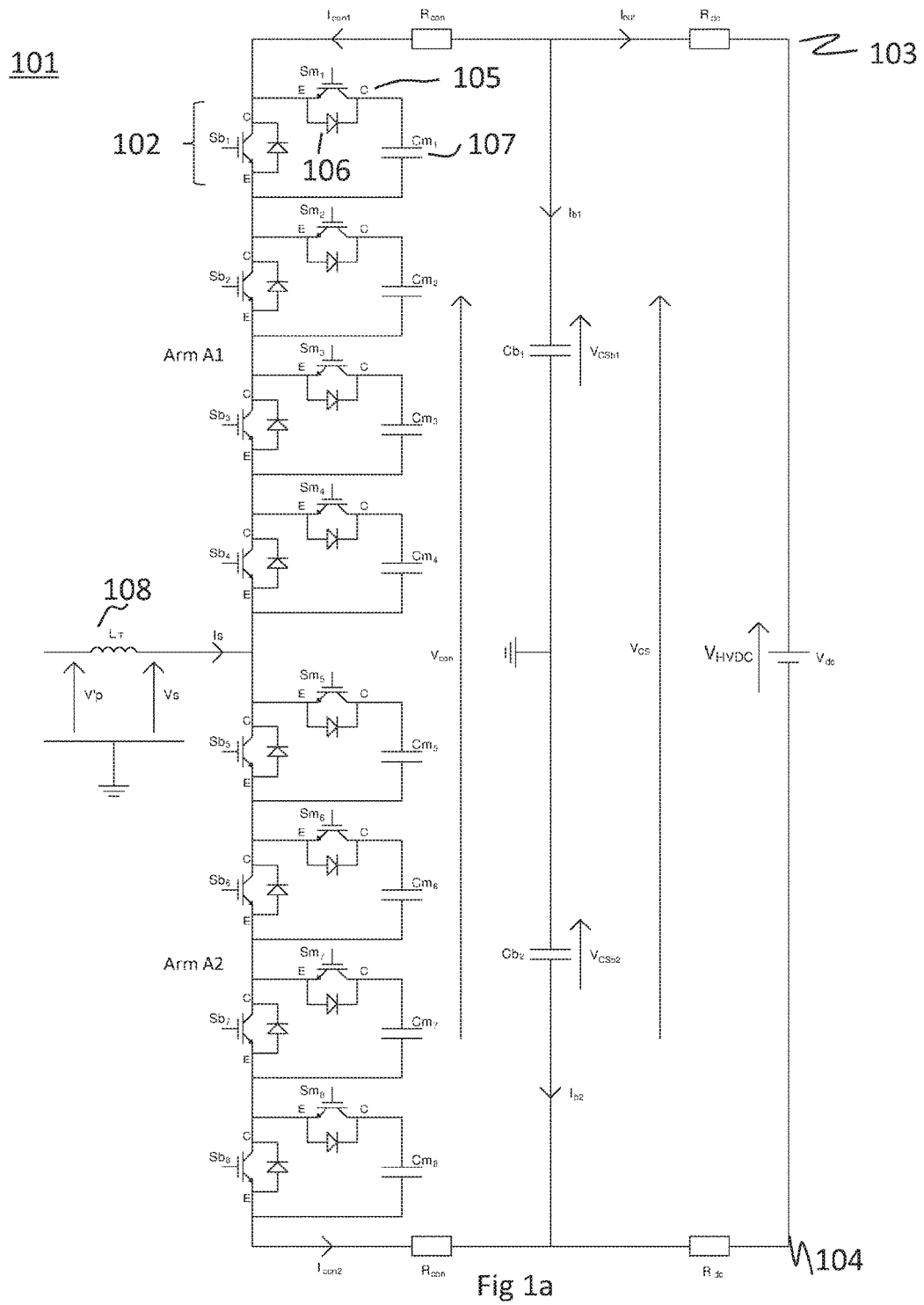
FIG. 1a provides a schematic diagram of a branch of a conventional modular multilevel converter arrangement.

In the drawings like reference numerals refer to like parts.
Conventional Modular Multilevel Converter FIG. 1a provides a schematic diagram of a branch 101 of a conventional modular multilevel converter (MMC).

The branch 101 includes two identical arms, arm A1, arm A2, each of which comprise a number of modules 102. The arms, arm A1, arm A2, are connected in series between a positive DC rail 103 and a negative DC rail 104. The DC rails 103, 104 are connected to the output of a high voltage direct current power source providing a DC bus voltage $V_{HVDC}$. Typically, in applications where the converter is being used to convert power from a high voltage direct current (HVDC) power source into high voltage AC output suitable for power transmission, a converter will comprise three such branches each of which are connected to the same high voltage direct current power source, (i.e. the same DC rails), but each of which are connected to a different phase of the three phase power network.

Each module 102 includes two switching valves and a capacitor 107. Each switching valve comprises a high power transistor 105 and a diode 106. The switching valves of each module 102 are controlled to "switch in" or isolate the capacitor 107 of the module 102. A capacitor 107 of a module 102 is switched in if the switching state of the transistors 105 is set such that the capacitor 107 is in the current path between the DC rails 103, 104, and isolated if the switching state of the transistors 105 is set such that the capacitor 107 is isolated from the current path between the DC rails 103, 104. The operation of the switching valves is controlled by a control unit (not shown).

Two smoothing capacitors Cb1, Cb2 split the DC bus voltage $V_{HVDC}$ and create an AC voltage with a +½ $V_{HVDC}$ peak and -½ $V_{HVDC}$ trough. The smoothing capacitors also smooth the DC voltage $V_{HVDC}$ reducing DC ripple.

DC bus resistance Rdc and HVDC transmission line resistance Rcon are also shown in FIG. 1.

During operation, if a capacitor 107 is switched in to the current path it is either charged or discharged. In conventional operation, during charging the switching valves of each module 102 are controlled by the control unit such that each capacitor 107 is charged in an attempt to maintain consistent average voltage level. In normal operation the capacitors are continually being charged and discharged therefore an individual capacitor's voltage level will vary, however this variance is around an average voltage level which is substantially the same for each capacitor. FIG. 1a shows a first arm current in the upper arm Icon1 and a second arm current in the lower arm Icon2. A capacitor is charged or discharged based on the direction of the arm current in the arm in which the capacitor is positioned. The direction of the arm current is determined by a number of factors including the phase angle between the AC voltage and current output of the converter.

Further, during operation, as well as controlling the switching valves to switch in and isolate the capacitors to maintain a consistent average voltage level across all the capacitors, the control unit also controls the switching valves of each module 102 to charge and discharge their respective capacitors in a sequence such that a stepped voltage output waveform is generated across an AC load 108. The stepped voltage output waveform is generated to approximate a sinusoid. As mentioned above, in applications where the converter is being used to convert power from a HVDC power source into high voltage AC output suitable for power transmission, typically the AC load 108 corresponds to one phase of a three phase power network.

During normal operation, the summed potential of all the capacitors of one branch switched in at any point in time must be as close as possible to the DC bus voltage. Therefore, in a standard MMC topology such as the arrangement shown in FIG. 1a in which the voltage level of each capacitor is close to the same average level, across both arms A1, A2, four capacitors must be switched in and four capacitors must be switched out at any point in time. For example, if one capacitor is switched in on the upper arm A1 then three capacitors must be switched in on the lower arm A2. In other words, at any one time, the number of capacitors switched in from the upper arm, arm A1, must be the same as the number of capacitors switched out from the lower arm, arm A2.

Figure 1B:
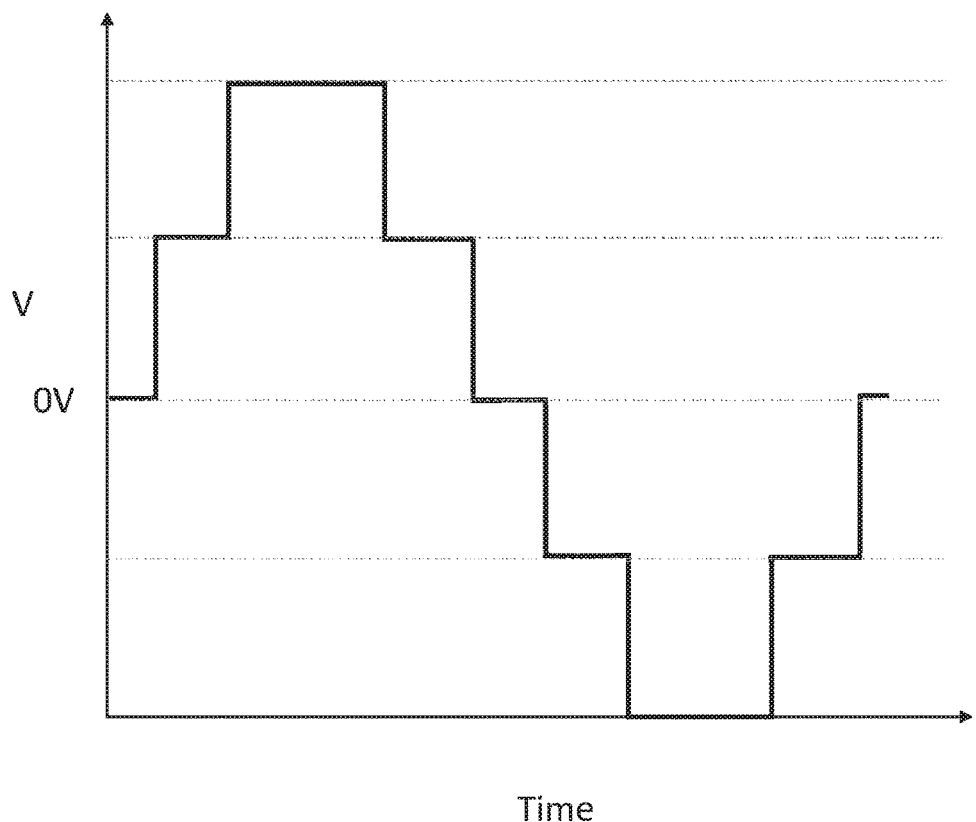

FIG. 1b shows a graph of an output AC voltage waveform which can be generated across the AC load 108 using the branch 101 of the converter shown in FIG. 1a. As can be seen, this voltage waveform comprises five distinct voltage levels corresponding to the different combinations of switched in and discharging capacitors that can be achieved using the conventional arrangement described with reference to FIG. 1a.

Figure 2:
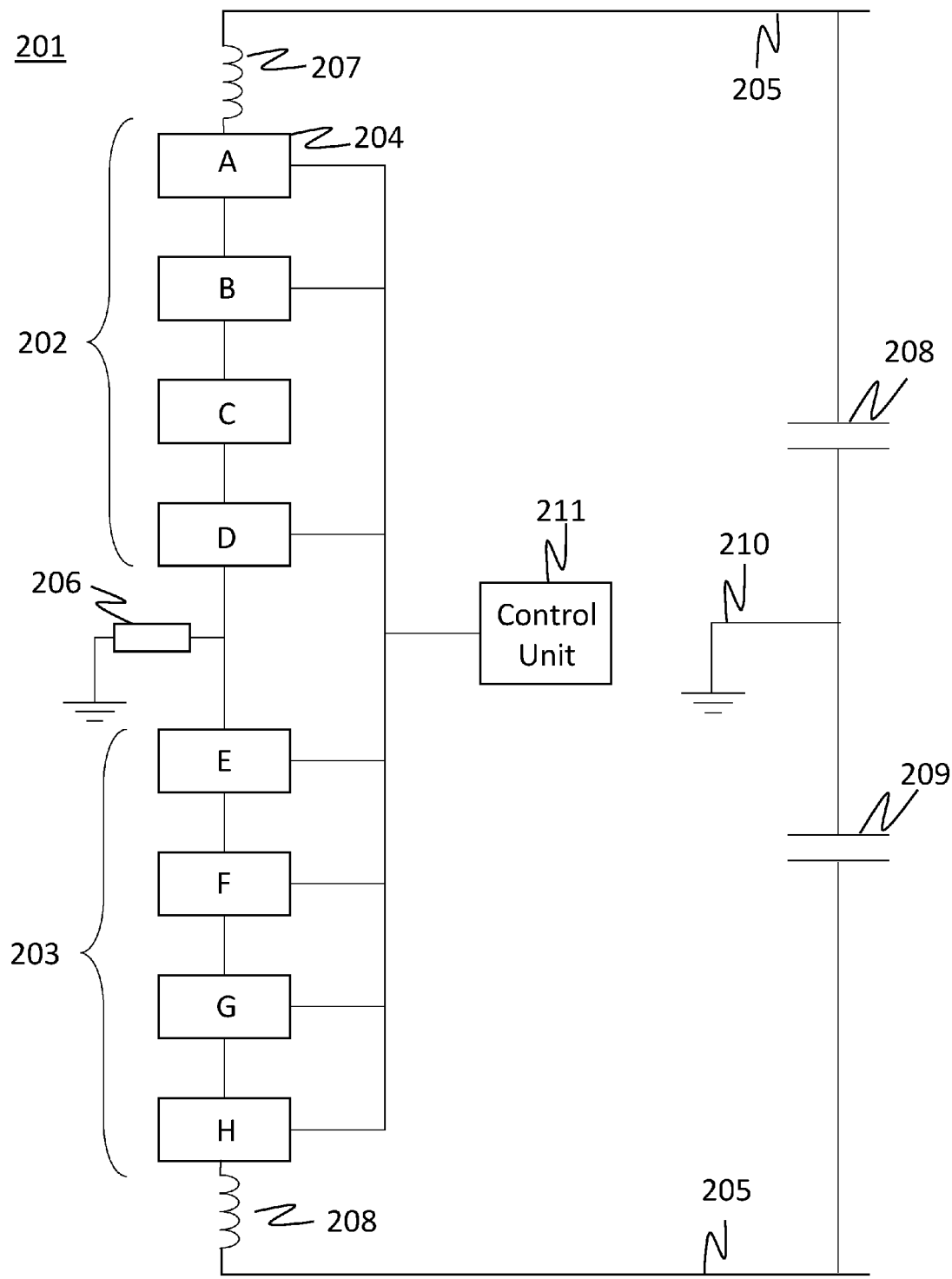
FIG. 2 provides a schematic diagram showing arrangement in accordance with an embodiment of the invention.

FIG. 2 provides a schematic diagram showing a branch 201 of a converter in accordance with certain embodiments of the present invention. The branch 201 includes a first arm 202 and a second arm 203. Each arm includes a number of modules 204 connected in series. As will be explained in further detail, each module includes individually controllable switching valves and an energy storage device (ESD). Typically, the ESD is a capacitor but can be provided with any suitable element capable of storing energy and discharging this energy by virtue of an electrical potential. The first and second arms 202, 203 are connected between two DC rails 205. An AC terminal 206 (an output of the converter) is positioned between the first and second arm 202, 203. The first and second arm 202, 203 each include an inductor 207, 208 to help limit current transients in the converter during operation.

A first and second DC capacitor 208, 209 are also connected across the DC rails 205 in parallel with the first and second arms 202, 203. These capacitors perform the same functions as the first and second smoothing capacitors Cb1, Cb2 shown in FIG. 1. A ground terminal 210 is positioned between the first and second DC capacitors 208, 209.

A control unit 211 is connected to each module 204 of each arm 202, 203. The control unit 211 controls the operation of each module 204 and specifically the switching state of each controllable switching valve. The control unit 211 can be provided by a processor including a memory with a suitable input/output interface allowing control signals to be sent to the controllable switching valves. As will be explained in more detail below, the control unit 211 is arranged to implement a control algorithm. Typically, the control algorithm is stored in the form of software in the memory of the control unit 211. However, in other examples, the control algorithm may be implemented by virtue of firmware within the control unit 211 or implemented as hardware for example by use of programmable logic such as a Field Programmable Gate Array (FPGA). In some examples, the functionality of the control unit may be distributed across several processors.

In operation, the voltage from a high voltage direct current (HVDC) power source is applied across the DC rails 205. The control unit 211 is arranged to either "switch in" or isolate the ESD from each module 204 in accordance with the predefined control algorithm. As will be understood, the switching in of an ESD couples it to the AC terminal (the converter output). Isolating an ESD decouples it from the AC terminal. In keeping with the operation of a conventional MMC, when an ESD of a module 204 is switched in by the control unit 211, depending on the direction of current flow in the branch 201, the ESD will either charge or discharge. Accordingly, the ESDs form a series arrangement of time varying voltage sources and voltage sinks that enable an AC input/output voltage waveform to be generated at the AC terminal 206. As will be understood, the AC input/output voltage waveform is not a perfect sinusoid but rather a stepped waveform that has an amplitude and cycle time from highest positive voltage to lowest negative voltage that corresponds to that of an AC voltage waveform. The control unit is coupled to sensors positioned within the modules and arms 202, 203 which are arranged to detect the magnitude and direction of the arm current along with the voltage across each module. This information is fed into the control algorithm enabling it to determine which modules to switch in and which modules to isolate at any given moment in time.

Typically the output AC voltages of a converter such as that shown in FIG. 2 may have amplitudes of ±150 kV, ±250 kV, ±300 kV or ±320 kV and operate at a frequency of 50 Hz.

In contrast to conventional techniques, in which an MMC is typically controlled such that each ESD maintains the same average voltage level during operation, in the arrangement shown in FIG. 2, ESDs in each arm 202, 203 are not all charged to the same potential. That is, in each arm 202, 203, at least one module 204 has an ESD which, during operation, is deliberately charged and maintained at a substantially different potential than the potentials to which the ESDs of the other modules are charged. As will be understood, a substantially different potential is one that is sufficiently different (greater or smaller) than potentials from other ESDs to allow the creation of additional voltage levels as explained in more detail below.

In certain examples, the voltage across each ESD will be monitored and maintained in such a way that individually they will be charged in the off duty and forward current flow period via the conduction of the switch or an associated body diode. Off duty ESDs in each arm can be toggled during operation to control and limit the amount of charging current flowing into each ESD.

In accordance with this differential charging and discharging technique, a greater number of levels can be produced in the AC output voltage waveform generated at the AC terminal 206. This is explained further with reference to FIG. 3.

Figure 3:
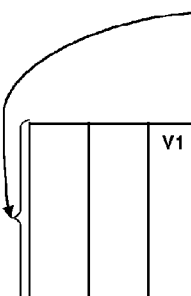
FIG. 3 shows a table illustrating the number of voltage levels that can be generated in an arm of a converter such as that shown in FIG. 2.

FIG. 3 shows a table illustrating the number of voltage levels that can be generated in an arm of a converter such as that shown in FIG. 2.

In the example shown in FIG. 2, each arm includes four modules and thus four separate ESDs. Each ESD is charged to a potential (the first ESD is charged to V1, the second ESD is charged to V2, the third ESD charge to V3, the fourth ESD is charged to V4). The first row of the table shows all the different combinations of switched in and isolated ESDs that are possible in a four module arm. As will be understood, the total voltage of each combination of ESDs is the sum of all the individual voltages of each switched in ESD. During operation, the sum of all the switched in module ESDs in the converter branch (both arms) is maintained as closely as possible to the DC bus voltage. Half the DC bus voltage minus the sum of potential voltages of the switched in module ESDs of arm 1 equals the magnitude of the output voltage level of the branch of the converter.

As described above, in conventional techniques the potential of each ESD is the same. This is shown in scheme "A" in FIG. 3 where each ESD has a potential of 25V. As can be seen from the second row of the table, assuming an example DC bus voltage of 100V, the total number of achievable voltage levels is five (i.e. −50V, −25V, 0V, 25V, 50V).

Scheme "B" in FIG. 3 shows an example where three of the ESDs are charged to the potential of 20V (corresponding to V1, V2 and V3), and the other ESD (corresponding to V4) is charged to a potential of 40V. As can be seen from the third row of the table, assuming a DC bus voltage of 100V again, the total number of achievable levels is six (i.e. −50V, −30V, −10V, 10V, 30V, 50V).

Scheme "C" of FIG. 3 shows an example where two of the ESDs are charged to a first potential and the other two of the ESDs are charged to a second potential. Again, assuming a DC bus voltage of 100V, as can be seen, in this case a total number of seven levels are achievable (i.e. −50V, −30V, −20V, −10V, 0, 10V, 20V, 30V, 50V).

It can thus be understood that by controlling at least one ESD in each arm to maintain during operation a different potential than the potential to which the other ESDs are charged and discharged in that arm, a greater number of voltage levels can be generated during operation of the converter. This means that the output of the converter can more closely approximate a sinusoid and thus the harmonic distortion of the output AC waveform can be reduced.

A number of module topologies are suitable for use in the arrangement shown in FIG. 2.

Figure 4A:
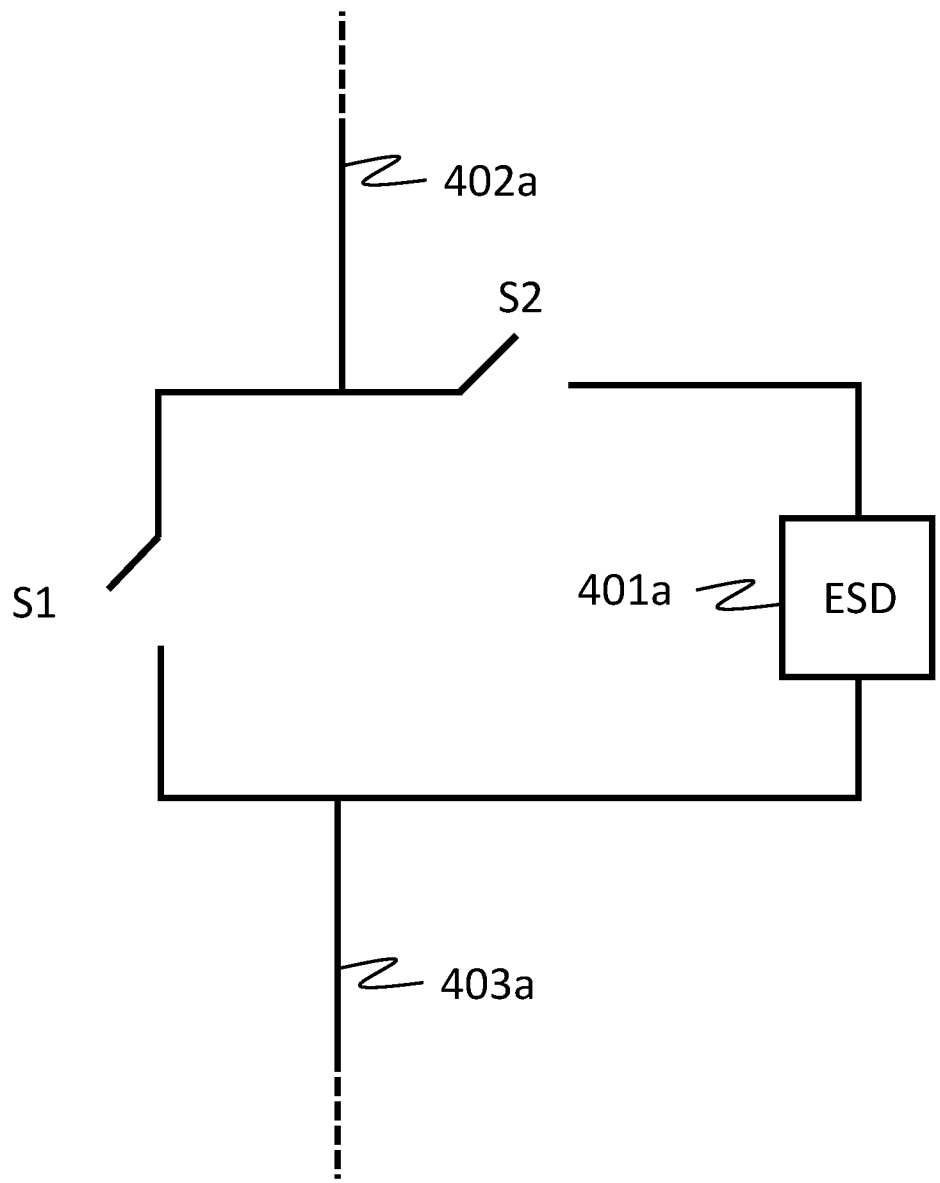
FIG. 4a provides a schematic diagram of an example of a module topology.

FIG. 4a provides a schematic diagram of an example of a module topology in which the module includes a first switching valve S1, a second switching valve S2 and an ESD 401a. The module is connected in series to the other modules of the arm via output lines 402a, 403a.

To switch in the ESD 401a, the second switching valve S2 is closed and the first switching valve S1 is opened. To isolate the ESD 401a, the second switching valve S2 is opened and the first switching valve S1 is closed. As explained above, the switching valves S1, S2 operate under the control of the control unit. The module arrangement shown in FIG. 4a provides a so-called "half bridge" configuration whereby, when discharging, the output of the module is a positive voltage corresponding to the potential to which the ESD 401a is charged.

Figure 4B:
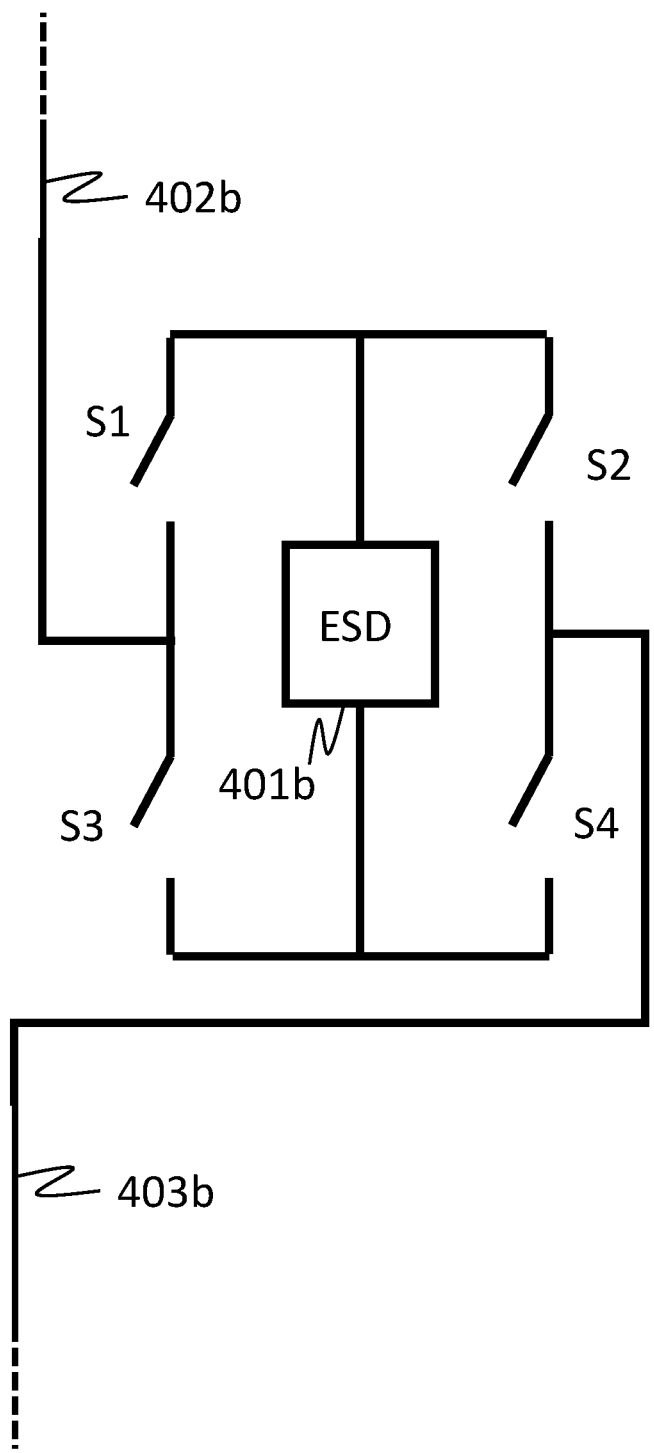
FIG. 4b provides a schematic diagram of an alternative module topology.

FIG. 4b provides a schematic diagram of an alternative module topology providing a "full bridge" configuration. The module configuration includes an ESD 401b and output lines 402a, 402b. However, in contrast to the topology shown in FIG. 4a, the module includes four switching valves, S1, S2, S3, S4. To switch in the ESD 401b, in a first configuration switching valves S3 and S2 are closed and switching valves S1 and S4 are open, or, in a second configuration switching the valves S1 and S4 are closed and switching valves S3 and S2 are open. In the first configuration, the output of the module is a voltage corresponding to the potential to which the module is charged, in the second configuration the output of the module is a voltage corresponding to the potential to which the module is charged but at an opposite polarity to that of the output voltage in the first configuration. In other words, the ESD 401b can be connected (switched in) in a forward or a reverse polarity.

In order to isolate the ESD 401b from the converter, switching valves S3 and S4 are closed and switching valves S1 and S2 are opened (the ESD 401b could also be isolated in the reverse configuration, i.e. with switching the valves S1 and S2 closed and switching valves S3 and S4 open).

The output of the module topology shown in FIG. 4b when the ESD 401b is switched in is therefore either a positive voltage or an inverted voltage. With an appropriate switching algorithm, the number of voltage levels possible is further increased by using modules with a full bridge topology.

FIG. 4c provides a table illustrating possible voltage combinations using a full-bridge module topology. FIG. 4c shows a number of possible voltage combinations for a branch in which each arm has four full-bridge modules and in which the ESD of a first module is charged to 4V, the ESD of a second module is charged to 3V, the ESD of a third module is charged to 2V and the ESD of a fourth module us charged to 1V. As can be seen, 11 possible voltage levels can be generated.

In some implementations, the switching valves can be implemented using multiple sub-switches. An example of such an arrangement is shown in FIG. 5.

Figure 5:
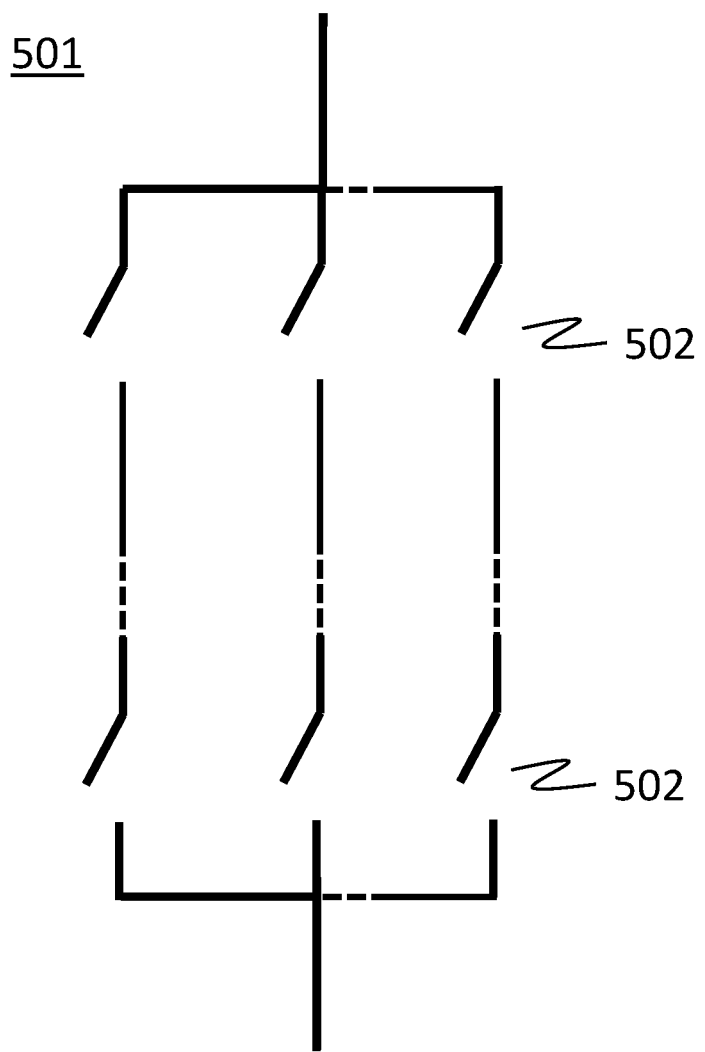
FIG. 5 provides a schematic diagram of a switching valve comprising a number of sub-switching switches.

FIG. 5 provides a schematic diagram of a switching valve 501 such as any of switching valves S1 to S4 shown in FIGS. 4a and 4b. As can be seen the switching valves 501 comprises a number of sub-switches 502. The sub-switches 502 are together arranged in parallel and in series. By arranging a switching valve in this manner, the switching valves resistance to high current and voltage stresses is improved by distributing these stresses across the multiple sub-switches The various switching valves and sub-switches discussed with reference to FIGS. 4a, 4b and 5 can be implemented using any suitable switch, for example high power insulated gate bipolar transistors (IGBTs).

Control Algorithm

As described above with reference to FIG. 2, in accordance with examples of the invention the ESD of each module of a converter are respectively switched in to, and isolated from, the current path of branches of the converter in accordance with a control algorithm. Accordingly, the ESDs are coupled and decoupled from the output of the converter.

The control algorithm is typically run on a processor of the control unit 211. The control algorithm controls the switching state of each of the switching valves of the converter over time.

In keeping with control algorithms that control conventional MMC arrangements, the control algorithm controls the switching state of each module to ensure that each ESD is maintained at its requisite potential and also controls the switching state of each module to contribute to the desired output voltage level to generate the AC voltage waveform.

However, in contrast with conventional techniques, the control algorithm ensures that at least one of the ESDs is charged to a substantially different potential than other ESDs in the converter. As explained above with reference to the table shown in FIG. 3, by arranging the control algorithm to maintain at least one ESD at a different potential than the other ESDs, the total number of voltage levels achievable in the output AC voltage waveform is increased and the harmonic distortion of the output current/voltage waveform can be reduced.

An example of a switching pattern provided by such a control algorithm is explained with reference to FIG. 6.

Figure 6:
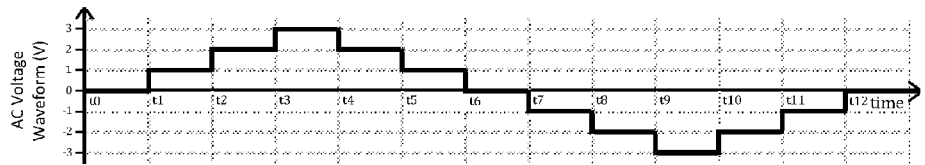
FIG. 6 shows a table relating to a control algorithm and a representation of an output AC voltage waveform.

FIG. 6 illustrates a switching pattern of a control algorithm that can be used to control a branch of a converter as shown in FIG. 2. That is a branch of a converter including an upper and lower arm, in which each arm comprises four modules. From the top, the upper arm's modules are identified as A, B, C and D respectively, and the lower arm's modules are identified as E, F, G and H respectively. Further, the modules are provided with switching valve arrangements as shown in FIG. 4a, that is each module includes two switching valves, a first switching valve S1 in parallel with the ESD and a second switching valve S2 in series with the ESD. The table in FIG. 6 shows the switching state of each of the two switches in each module at a given point in time (t0, t1, t2 etc.). As can be seen, the ESDs in upper arm modules A and B, and lower arm modules E and F are charged to 1V and the ESDs in upper arm modules C and D, and lower arm modules G and H are charged to 2V. In this illustrative example the DC bus voltage is 6V.

FIG. 6 also includes a representation of the output AC voltage waveform formed at the AC terminal of the branch of the converter.

As will be understood, beyond providing a suitably adapted control algorithm (i.e. one that is capable of charging the ESDs to different potentials and deploying a switching pattern as exemplified in FIG. 6), certain examples of the present invention do not require any further modification to a conventional power converter arrangement, the only requirement being the provision of a control algorithm that enables ESDs to be charged to and discharged at substantially different potentials and that the increased voltage and current stress is acceptable.

In some examples, the control algorithm is arranged to change, over time, the potentials to which each ESD is charged. For example during a first period, the control algorithm may be such that half of the ESDs of the converter may be charged and discharged at a first potential, and the other half of the ESDs of the converter may be charged and discharged at a second, higher potential. During a second period, the control algorithm may be such that the ESDs that were charged and discharged at the second higher potential are charged and discharged at the first, lower potential, and the ESDs that were charged and discharged during the first period at the first lower potential are charged and discharged at the second higher potential. In this way, stresses associated with higher energy and voltage levels will be distributed more evenly across the components of the converters (e.g. the switching valves in each module).

In some examples, the control algorithm uses pulse width modulation (PWM) to charge the ESDs. With no load, in the charging state the ESDs charge using the DC bus. If all the capacitors in one arm are connected simultaneously, the voltage will split evenly across them. If some are connected for longer than others, the voltage will split non-uniformly. To achieve more sensitivity, particularly as ESDs reach the desired voltage a fast switching sequence across the switches can be employed.

In some examples, a localised control algorithm is used to continually vary the potential of each ESD. In such examples, smaller ESDs, which will discharge at a faster rate may be used in the modules. By quickly switching module ESDs in and out for varying lengths of time during the module ESD's potentials will vary over each switching period in a controlled manner. Thereby allowing a more sinusoidal AC waveform to be created from fewer voltage levels. This is similar to standard PWM methods, although they generally require a filter on the AC terminal to achieve the smoother AC waveform.

Various modifications can be made to the examples of the inventions described above.

It will be understood that in some implementations, the arrangement shown in FIG. 2 is one branch of three branches of a 3-phase DC to AC converter in which the other two branches correspond to that shown in FIG. 2 and are also controlled by the control unit 211 in accordance with the control algorithm. However, it will be understood that a control unit controlled by a control algorithm according to examples of the invention can also control poly-phase converters comprising more than three branches or a single phase converter comprising one branch.

Further, the examples of the invention discussed above, have been described mainly in terms of a modular multilevel converter receiving a HVDC input used to charge ESDs, where each ESD is provided by a single high-energy capacity capacitors. However, in other examples, each ESD may be provided by a number of capacitors.

It will be understood that in the preceding description the term "voltage", where appropriate, is used interchangeably with the term "potential".

The ESDs can be provided by other types of suitably connected energy storage devices such as fuel cells, electric generators, batteries, photovoltaic cells and so on. Alternatively, a converter may be provided including ESDs of different types. As will be understood by the skilled person, in each of these possible implementations, switching valves, under the control of a suitable control mechanism, such as a control algorithm, will be arranged to sequentially discharge each ESD to generate an AC output waveform. At least some of the ESDs will be discharged at different potentials to generate an AC output waveform with an increased number of voltage levels.

In certain embodiments of the invention, a "set" based control algorithm can be used. In such embodiments, the ESDs in each arm of a convertor are grouped into sets. Each set contains at least two ESDs. The "nominal voltage" of each ESD in a given set is controlled by the control unit to be substantially the same (equal). Further, each set has different nominal voltage. A given set in each arm is maintained with ESDs with a lowest nominal voltage. The ESDs of other sets have a nominal voltage which is an integer multiple of this lowest nominal voltage. In this way, the nominal voltage of ESDs of each set are significantly different from all the other sets in an arm of the convertor.

As mentioned above, each set contains at least two ESDs and the ESDs are maintained at a lowest nominal value or an integer multiple of this lowest nominal value. This integer value is chosen so that the nominal voltage of the ESDs from each set (with the exception of the set with the lowest nominal voltage) can be created through the sum or combination of ESDs from other sets. This can be from multiple ESDs from one set or ESDs from a selection of sets. In this way, certain voltage levels of the sinusoid to be synthesised can be generated by using any of a number of possible combinations of ESDs from different sets. Advantageously, this creates switching state redundancy (referred to as "redundant states") during the operation of the convertor.

More specifically, as certain voltage levels can be generated using different combinations of ESDs from different sets (by virtue of the provision of "redundant states"), at certain points in time at least, the control unit can select which sets to use, and from these selected sets, select specific ESDs. The control unit can be arranged to implement a set selection algorithm that makes this selection taking into account the requirement to balance the set voltages, minimise losses based on the arm current direction, optimise the synthesised AC voltage, the set voltages and the status of the sets currently switched in i.e. how many ESDs are already switched in or out within each set. Further, the set selection can be made such that the AC wave is substantially symmetrical and the chance of creating additional harmonics is reduced.

The arrangement of ESDs from each arm into sets can be manifested in any suitable way. In certain examples, a physical grouping is provided whereby different ESDs are physically separated such that manual intervention is required to change to which set they belong (e.g. by changing cable connections to the controller).

Alternatively, the arrangement of ESDs into sets could be achieved by "a non-physical" separation by the control unit controlling which ESDs belong to which set by changing the nominal voltage and switching timing for each ESD. In this way, the duty of each ESD can be equally distributed within a given cycle or within its service life. Beneficially the latter approach would allow different ESDs within an arm to be moved freely between sets to fulfil the control objectives for example but not limited to equalising voltage, current or switching stresses on ESDs to among other possible benefits, prolong converter life.

Figure 7:
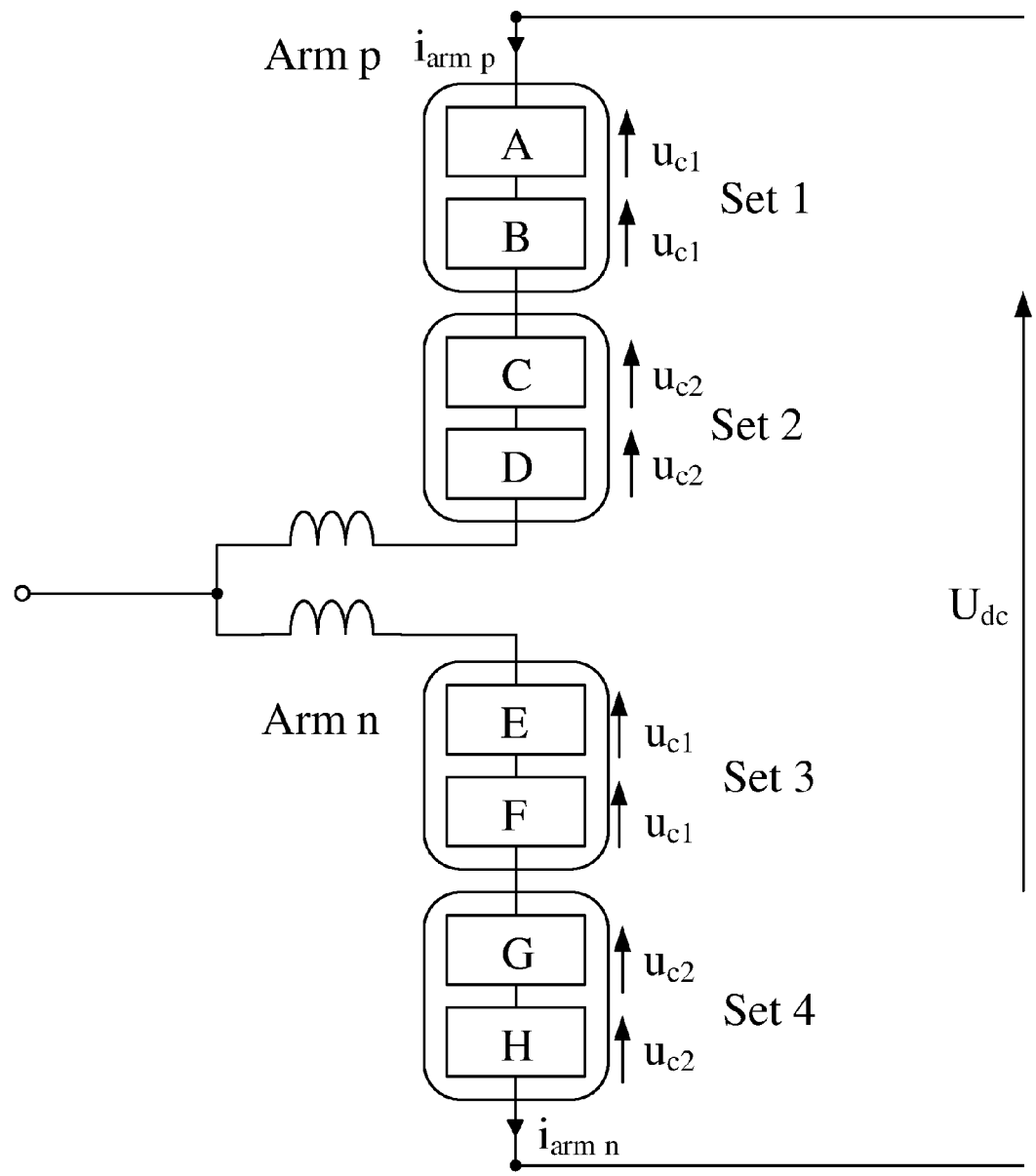
FIG. 7 provides a schematic diagram illustrating the concept of grouping ESDs together into sets.

FIG. 7 provides a schematic diagram illustrating the concept of grouping ESDs together into sets. FIG. 7 shows a branch of a convertor structurally corresponding to that shown in FIGS. 1 and 2. The branch of the convertor includes a first arm, Arm p, and a second arm, Arm n. Arm p has four modules with four ESDs: A, B, C and D; and Arm n has four modules with four ESDs E, F, G and H.

ESDs A and B are grouped into a first set, Set 1; ESDs C and D are grouped into a second set, Set 2; ESDs E and F are grouped into a third set, Set 3; and ESDs G and H are grouped into a fourth set, Set 4.

Figure 8:
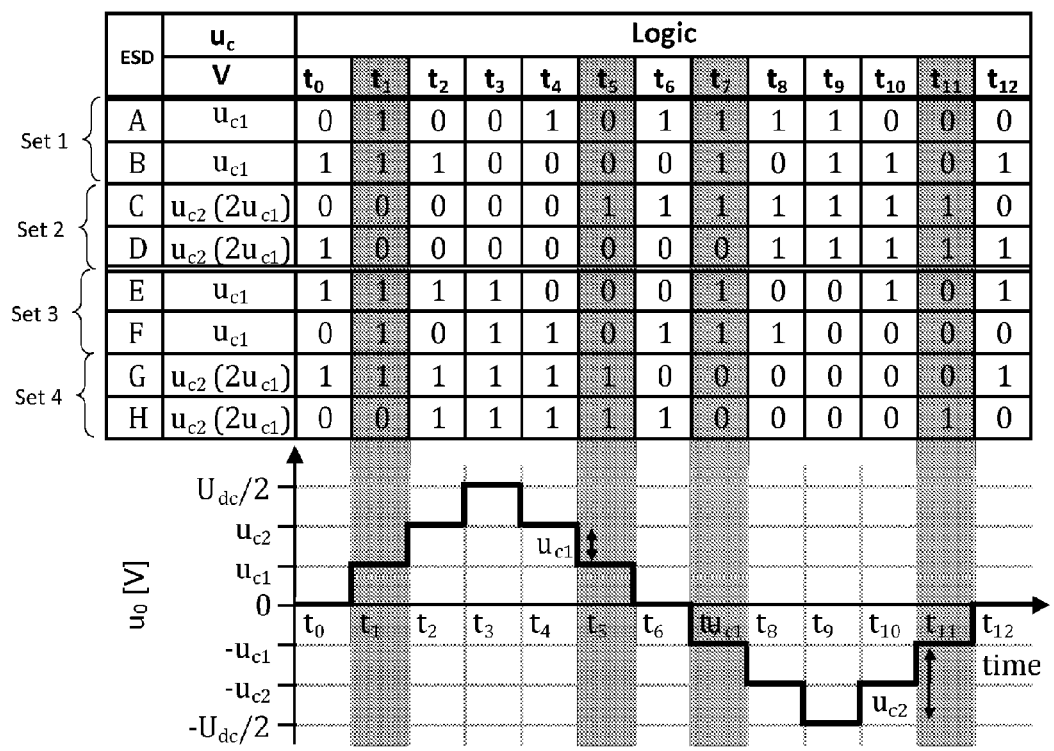
FIG. 8 provides a schematic diagram illustrating an exemplary switching pattern based on the grouping of ESDs into sets as shown in FIG. 7.

FIG. 8 provides a schematic diagram illustrating an exemplary switching pattern based on the grouping of ESDs into sets as shown in FIG. 7.

FIG. 8 illustrates the provision of redundant states (as highlighted in t1 and t5, and t7 and t11) along with the resulting AC waveform shape. An example of the state redundancy can be seen by comparing t1 and t5: the voltage level uc1 can be generated by using sets 1, 3 and 4 or by using sets 2 and 4.

By implementing the concept of sets detailed above, when a given voltage level is required to generate a certain part of the synthesised output sinusoid, the control unit can generate this output voltage level by selecting one of a number of possible sets.

As mentioned above, the control unit can be arranged to implement a set-selection algorithm to select a set. An example of such an algorithm is explained with reference to FIG. 9.

A set is available if two conditions are satisfied:

1. At least one ESD within the considered set must be off (i.e. not switched in) if an additional ESD is to be switched on (i.e. switched in) in the considered set. At least one ESD within the considered set must be on if an additional ESD is to be switched off in the considered set.

2. Either:

a) the considered set is the lowest voltage set (for example set 1 or 3 as shown in FIG. 7 and FIG. 8)

or b) at least one ESD is already on in all the sets that have a lower nominal voltage than the considered set if an additional ESD is to be switched on from the considered set. And at least one ESD is already off in all the sets that have a lower nominal voltage than the considered set if an additional ESD is to be switched off from the considered set. For example (with reference to FIG. 7 and FIG. 8) if the considered set is Set 2, if an ESD is to be turned on in Set 2 then at least one ESD must already be turned on in Set 1. Similarly if an ESD is to be turned off in Set 2 then at least one ESD must already be turned off in set 1

It will be understood that an additional ESD cannot be switched in if all the ESDs in the set are already on. Similarly an ESD cannot be switched out if all the ESDs are already off in the set, hence condition 1 must be true.

Condition 2 ensures that each voltage step is the same height as the voltage of one of the ESDs within the lowest voltage set ($u_{c1}$ in FIGS. 7 and 8). If an ESD from a set with a higher voltage than $u_{c1}$ is switched in then ESDs from the lower sets must be switched out to ensure the net change is only $u_{c1}$. The opposite is true if a higher voltage set is switched out. As a result there must be at least one ESD on/off in each of the lower voltage sets. As explained below, the output of a set control is passed to a module control where the ESD to be switched in or out from each set is selected.

The algorithm selects which set to switch in or out based on the direction of the arm current and the relative set voltage. Therefore, if an ESD must be switched in and the arm voltage is positive, the lowest relative voltage set available is selected or the highest if the arm voltage is negative. To switch an ESD out, the lowest relative voltage set is chosen if the arm voltage is negative and the highest if the arm voltage is positive.

By implementing this algorithm, the voltages of each ESD can be managed such that they do not diverge significantly from the control nominal value during operation.

Figure 9:
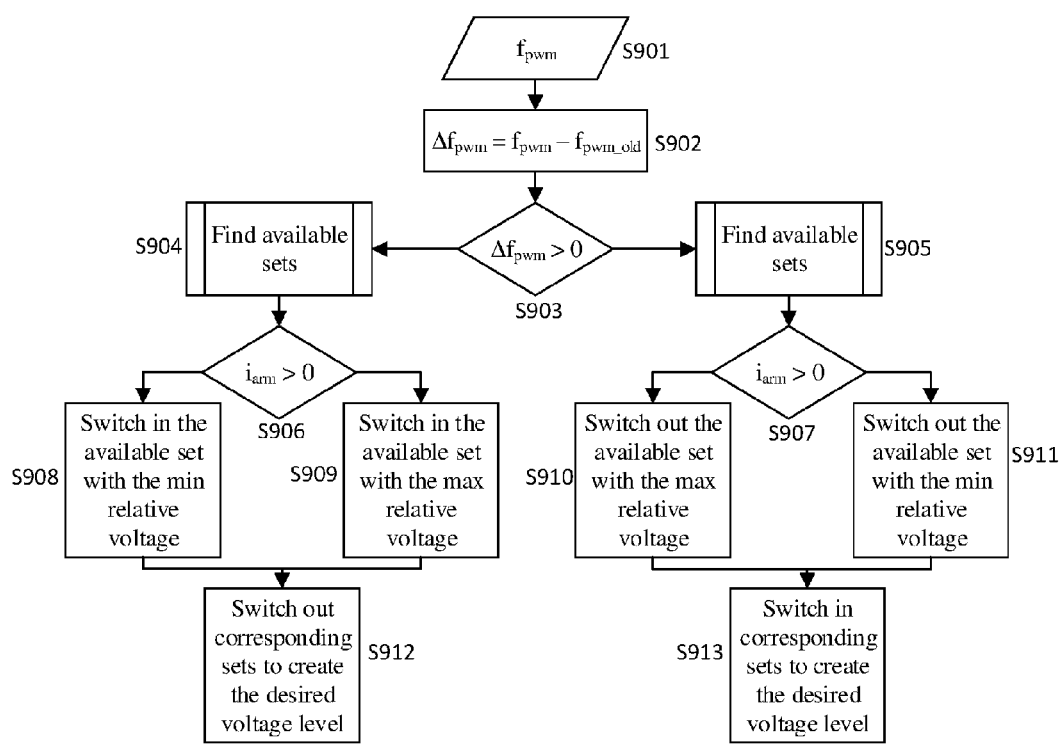
FIG. 9 illustrates an example set selection algorithm.

A specific implementation of the algorithm shown in FIG. 9 comprises the steps detailed below. The algorithm is implemented by a control unit as described above.

As is known in the art, the control unit includes a number of stages including, typically a "high level control" and a "low level control". In the art, the term "high level control" generally refers to the stages of the control unit that provides power flow control and circulating current cancellation functions. In the art, the term "low level control" generally refers to the stages of the control unit that are concerned with maintaining individual ESD voltages such that they are all substantially similar.

Figure 11:
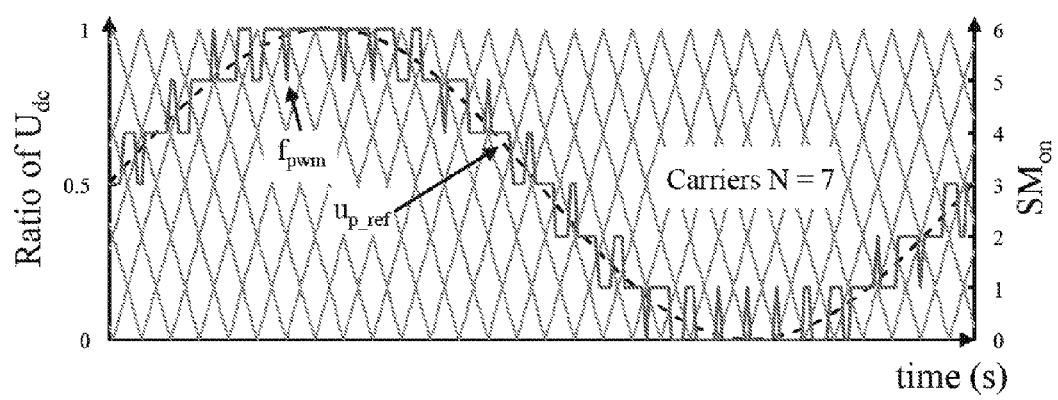

The high level control generates a control signal $f_{pwm}$ which, as is known in the art, can be in the form of a stepped waveform as illustrated in FIG. 11. The stepped waveform shown in FIG. 11 is the modulated PWM signal generated by the high level control. In this example each step signals a required change in the AC terminal voltage created by switching modules in each set either in or out according to a switching pattern similar to that shown in FIG. 8.

This control signal is received by a "set control". In accordance with certain examples of the invention, the set control is an additional stage that implements a set selection algorithm. An example of such an algorithm is shown in FIG. 9 and described below:

At step S901, the control signal from the "high level control" is received (i.e. $f_{pwm}$).

At step S902, the "set control" determines whether the voltage at the AC terminal should be increased or decreased during the time step.

At decision point S903, if $\Delta f_{pwm}$ is greater than 0, i.e. whether $f_{pwm}$ is increasing is true, then the algorithm moves to step S904. Alternatively, if, $\Delta f_{pwm}$ is greater than 0 is false i.e. if $f_{pwm}$ is decreasing then the algorithm moves to step S905.

At step S904, the algorithm, running on the set control determines which sets are actually available to switch in according to the conditions set out above.

The algorithm then moves to decision point S906.

At decision point S906, if, the arm current is positive then the algorithm moves to step S908. Alternatively, if, the arm current is negative then the algorithm moves to step S909.

At step S908, the set control outputs a control signal to switch in an ESD from the minimum relative voltage set.

At step S909, the set control outputs a control signal to switch in an ESD from the maximum relative voltage set.

The algorithm then moves on to step S912.

At step S912, if the set selected is not the lowest voltage set (e.g. Set 1 in FIG. 7) then set control generates a control signal to turn off an ESD from each set at a lower voltage.

At step S905, the algorithm determines which sets are actually available to switch out according to conditions 1 and 2 detailed above. The algorithm then moves to decision point S907.

At decision point S907, if, if the arm current is positive then the algorithm moves to step S910. Alternatively, if, if the arm current is negative then the algorithm moves to step S911.

At step S910, the set control generates a control signal to switch out an ESD from the maximum relative voltage set.

At step S911, the set control generates a control signal to switch out an ESD from the minimum relative voltage set.

The algorithm then moves on to step S913.

At step S913, if the set selected is not the lowest voltage set (e.g. Set 1 in FIG. 7) then the set control generates a control signal to switch in an ESD from each set at a lower voltage.

As mentioned above, in accordance with certain examples of the invention, the control unit can be adapted to facilitate the set selection technique described above by providing an additional stage, i.e. the "set control", to the stages of a conventional control unit. This is depicted in FIG. 10.

Figure 10:
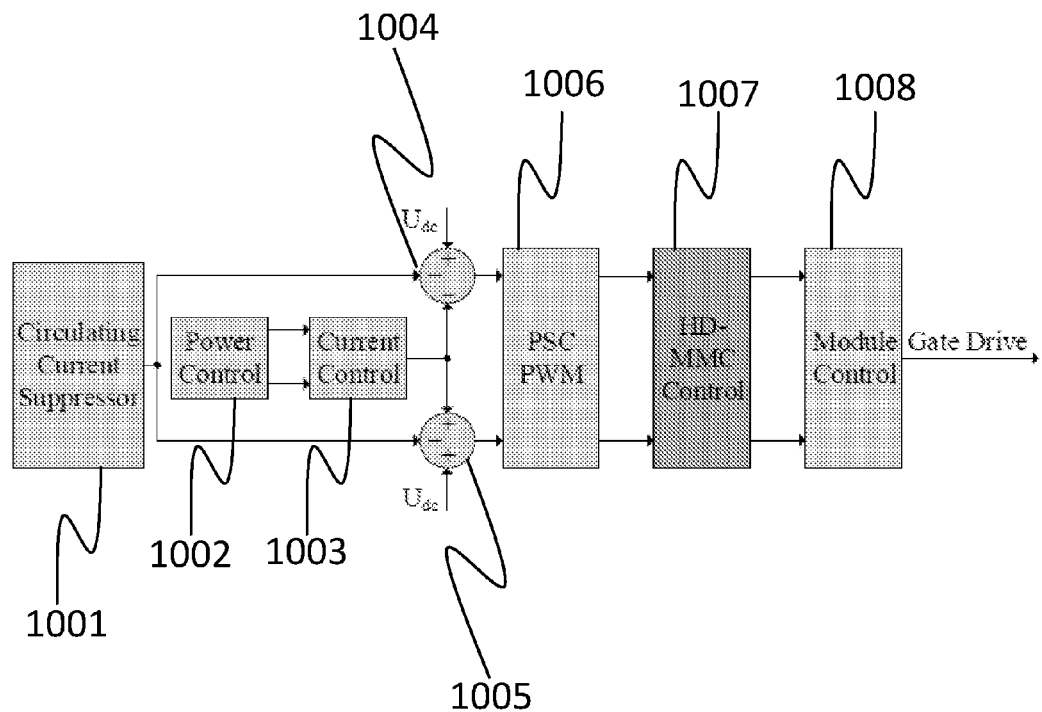
FIG. 10 provides a schematic diagram of an adapted control unit in accordance with certain embodiments of the invention, and FIG. 11 illustrate a control signal generated by a high level control.

FIG. 10 provides a schematic diagram of an adapted control unit in accordance with certain embodiments of the invention.

The adapted control unit comprises a number of conventional stages performing functions in accordance with MMC control units known in the art. These include the following stages.

A circulating current suppressor 1001 which eliminates the second harmonic current that flows between the branches of the converter by generating an antiphase voltage reference based on the measured second order harmonic and the desired magnitude of the second order harmonic.

A power control 1002 which generates a reference current based on the error in the measured power and desired power output of the converter.

A current control 1003 which creates the reference voltage based on the error between the reference current and measured AC terminal current of the converter.

A summation function 1004 which sums the output of the current suppressor to the reference waveform from the current suppressor. This AC waveform is then given a DC offset equal to the DC bus voltage ($U_{dc}$) for the benefit of the PSC PWM.

A subtracting function 1005 which subtracts the output of the current suppressor to the reference waveform from the current suppressor. This AC waveform is then given a DC offset equal to the DC bus voltage ($U_{dc}$) for the benefit of the PSC PWM.

A PSC PWM 1006 which generates the modulated waveform $f_{pwm}$ for the converter to follow.

A module control 1008 which generates an output signal controlling which ESDs are switched in and out.

As is known, the output of the adapted control unit is the gate drive which provides a control signal controlling which ESDs are switched in and switched out of the current path.

As mentioned above, the adapted control unit further includes a set control (identified in FIG. 10 as an HD-MMC control) 1007 which is positioned between the PSC PWM 1006 and the module control 1008. The HD MMC control 1007 performs the set selection algorithm described above. The HD MMC control 1007 receives the control signal from the PSC PWM 1006 and provides as an output digital pulses to the module control 1008 indicating which sets have been selected.

By receiving the output of the PSC PWM 1006 the set control (HD-MMC control 1007) is triggered to determine which set(s) are available to be switched in or out and which of these is best to switch in/out to best balance their voltages.

As can be seen from FIG. 10 the set control 1007 is positioned between the high level power control function (e.g. all of the stages to the left of the set control 1007) and the module control 1008 (the final stage module selector). More specifically, the set control 1007 is positioned between the PWM control function 1006 and the module control 1008 (the final stage module selector).

The provision of the additional set control (e.g. HD-MMC control 1007) implementing the set selection algorithm described above can improve converter stability by reducing ESD voltage diversion from nominal values and reduction or elimination of additional low order harmonic introduction. This is because the set control is constantly controlling the order in which the sets are inserted and removed such that the set voltages remain close to their nominal voltage.

This ensures that each voltage step remains consistent throughout each waveform and reduces induced harmonics. The induced harmonics are further reduced since balancing each set voltage doesn't change the nominal voltage step at any point between each waveform. Therefore each waveform is repeated exactly at the fundamental frequency rather than, for example, every 10 waveforms, as a result the creation of additional low frequency harmonics is reduced. As is known, it is beneficial to remove harmonics as they must be filtered out and increase converter losses. Low order harmonics are particularly difficult to filter out as lower frequency filters are much larger and more expensive than high frequency filters.

It will be understood that the concept of sets described above is principally applicable to "half bridge" MMC module topology. It will be understood that the sets concept is applicable for other topologies but appropriately modified switching patterns might be required.

Furthermore, it may be possible to take advantage of the additional redundancy of being able to reverse the polarity of the module ESDs to reduce the minimum number of modules per set or at the very least better balance the set and module voltages.

In examples of certain embodiments of the invention described above, the power converter and power converter technique have been described mainly in terms of converting power from a high voltage DC input to an AC output. However, it will be understood that, in keeping with conventional MMC arrangements, a power converter and power converter technique in accordance with certain embodiments of the invention can also be used in a reverse configuration. That is, high voltage AC input to can be converted to a high voltage DC output (e.g. full wave rectification) by maintaining at least two of ESDs at of an arm at substantially different potentials. In accordance with embodiments of the invention operating in this configuration, the output DC waveform has reduced harmonic distortion compared to conventional MMC AC to DC power conversion.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:
1. A power conversion method, comprising:
charging a plurality of energy storage devices of a power converter from an input power source, wherein the power converter comprises at least one branch including a first arm connected between an AC terminal and a first DC rail and a second arm connected between the AC terminal and a second DC rail; and
sequentially coupling and decoupling energy storage devices of the plurality of energy storage devices to an output, wherein charging the plurality of energy storage devices comprises maintaining at least two of the plurality of energy storage devices at substantially different potentials, and wherein a plurality of energy storage devices in each arm are grouped into sets of at least two energy storage devices, and a control unit is arranged to control charging of the energy storage devices, within each set, to a substantially equal potential, and the energy storage devices in each set of an arm are charged to a significantly different potential from all other sets of said arm.

2. A method according to claim 1, wherein the input power source is a high voltage DC power source, and sequentially coupling and decoupling the energy storage devices of the plurality of energy storage devices to the output generates output voltage levels corresponding to an AC voltage waveform.

3. A method according to claim 1, wherein the input power source is a high voltage AC power source, and sequentially coupling and decoupling the energy storage devices of the plurality of energy storage devices to the output generates an output DC voltage waveform.

4. A method according to claim 1, wherein the steps of sequentially coupling and decoupling the energy storage devices of the plurality of energy storage devices and charging the plurality of energy storage devices are in accordance with a control algorithm.

5. A method according to claim 1, wherein one or more of the energy storage devices are sequentially coupled to the output such that the energy storage devices can be coupled in a forward polarity and a reverse polarity.

6. A method according to claim 4, wherein the control algorithm is arranged to change over time the potential to which individual energy storage devices are charged to.

7. A method according to claim 1, wherein the step of charging the plurality of energy storage devices is performed using pulse width modulation.

8. A method according to claim 1, comprising, selecting one or more sets from the plurality of sets, and selecting energy storage devices from the selected one or more sets to generate the output voltage levels.

9. A computer program stored on a non-transitory computer readable medium for controlling a power converter, said computer program when run on a processor being arranged to cause the processor to control the power converter to perform the power conversion method according to claim 1.

10. A power converter comprising:

at least one branch including a first arm connected between an AC terminal and a first DC rail and a second arm connected between the AC terminal and a second DC rail; and a plurality of energy storage devices and a control unit, said control unit arranged to control charging of the energy storage devices by an input power source, and said control unit is further arranged to control a sequential coupling and decoupling of the energy storage devices to an output of the converter, wherein charging the plurality of energy storage devices comprises maintaining at least two of the plurality of energy storage devices at substantially different potentials, and wherein a plurality of storage devices in each arm are grouped into sets of at least two energy storage devices, and the control unit is arranged to control charging of the energy storage devices, within each set, to a substantially equal potential, and the energy storage devices in each set of an arm are charged to a significantly different potential from all other sets of said arm.

11. A power converter according to claim 10, wherein the input power source is a high voltage DC power source, and the control unit controls the sequential coupling and decoupling of the energy storage devices to the output to generate output voltage levels corresponding to an AC voltage waveform.

12. A power converter according to claim 10, wherein the input power source is a high voltage AC power source, and the control unit controls the sequential coupling and decoupling of the energy storage devices to the output to generate output voltage levels corresponding to a DC voltage waveform.

13. A power converter according to claim 10, wherein the control unit controls the charging of the energy storage devices and controls the sequential coupling and decoupling of the energy storage devices to the output in accordance with a control algorithm.

14. A power converter according to claim 10, wherein one or more of the energy storage devices are arranged to be coupled to the output in a forward polarity and a reverse polarity to generate the output voltage levels.

15. A power converter according to claim 13, wherein the control algorithm is arranged to change over time the potential to which individual energy storage devices are charged to.

16. A power convertor according to claim 10, wherein the control unit is arranged to select one or more sets from the plurality of sets and then to select specific energy storage devices from the selected one or more sets to generate the output voltage levels.

17. A power converter according to claim 16, wherein the control unit comprises a high level power control function, a final stage module selector and a set control for selecting the sets, wherein the set control is positioned at a stage in the control unit between the high level power control function and the final stage module selector.

18. A power converter according to claim 16, wherein the control unit comprises a PWM control function and a final stage module selector and a set control for selecting the specific sets, wherein the set control is positioned at a stage in the control unit between the PWM control function and the final stage module selector.

* * * * *

UNITED STATES PATENT AND TRADEMARK OFFICE
CERTIFICATE OF CORRECTION

Page 1 of 1

PATENT NO. : 10,483,870 B2
APPLICATION NO. : 15/573250
DATED : November 19, 2019
INVENTOR(S) : Chong Hwa Ng It is certified that error appears in the above-identified patent and that said Letters Patent is hereby corrected as shown below:

In the Specification

In Column 13, Line 33, after "1" insert --.--.

In the Claims

In Column 18, Claim 16, Line 38, delete "convertor" and insert --converter--.

Signed and Sealed this
Third Day of March, 2020

Andrei Iancu
*Director of the United States Patent and Trademark Office*